(12) United States Patent
Belcher et al.

(10) Patent No.: US 10,895,358 B2
(45) Date of Patent: Jan. 19, 2021

(54) LASER AUTOMOTIVE LAMP APPARATUS

(71) Applicant: SMR Patents S.à.r.l., Luxembourg (LU)

(72) Inventors: Simon Belcher, Lonsdale (AU); James Nicholson, Lonsdale (AU); Sam Thoday, Lonsdale (AU)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/623,931

(22) PCT Filed: Jun. 25, 2018

(86) PCT No.: PCT/EP2018/066967
§ 371 (c)(1),
(2) Date: Dec. 18, 2019

(87) PCT Pub. No.: WO2019/002212
PCT Pub. Date: Jan. 3, 2019

(65) Prior Publication Data
US 2020/0132269 A1    Apr. 30, 2020

(30) Foreign Application Priority Data
Jun. 27, 2017  (AU) ................................ 2017902480

(51) Int. Cl.
*F21S 41/16*     (2018.01)
*F21S 41/176*    (2018.01)
(Continued)

(52) U.S. Cl.
CPC ............. *F21S 41/16* (2018.01); *F21S 41/176* (2018.01); *H01S 3/0637* (2013.01);
(Continued)

(58) Field of Classification Search
CPC .......... F21S 41/16; F21S 41/176; F21S 41/20; F21S 41/24; F21S 41/25; H01S 3/0637;
(Continued)

(56) References Cited

U.S. PATENT DOCUMENTS

| 5,436,919 | A | 7/1995 | Chwalek et al. |
| 2007/0109784 | A1* | 5/2007 | Kosnik ............. G02B 19/0014 362/260 |

(Continued)

OTHER PUBLICATIONS

International Search Report dated Oct. 4, 2018 of International application No. PCT/EP2018/066967.
(Continued)

*Primary Examiner* — Bao Q Truong
(74) *Attorney, Agent, or Firm* — Jones Day (57) ABSTRACT

A laser light source apparatus includes a laser diode, a first optical assembly having one or more lenses for generating a collimated laser beam from light emitted by the laser diode, a doped microstructured glass block configured to generate laser emissions at at least a first wavelength and a second wavelength when pumped by the collimated laser beam, an input beam lens for focusing the collimated laser beam onto an input surface of the microstructured glass block, an optical alignment assembly, an output light guiding assembly, and a housing for containing and supporting the optical alignment assembly and the output light guiding assembly.

15 Claims, 7 Drawing Sheets

(51) Int. Cl.
*H01S 3/063* (2006.01)
*H01S 3/08* (2006.01)
*H01S 3/0941* (2006.01)
*H01S 3/16* (2006.01)
*H01S 3/17* (2006.01)

(52) U.S. Cl.
CPC ...... *H01S 3/08086* (2013.01); *H01S 3/09415* (2013.01); *H01S 3/1613* (2013.01); *H01S 3/173* (2013.01)

(58) Field of Classification Search
CPC ............. H01S 3/08086; H01S 3/09415; H01S 3/1613; H01S 3/173; F21V 5/00; F21V 5/008; F21V 29/00; F21V 29/503; F21V 29/70; F21V 2200/00; F21V 2200/20; G02B 6/0011
See application file for complete search history.

(56) References Cited

U.S. PATENT DOCUMENTS

2011/0134953 A1    6/2011   Weichmann et al.
2012/0106185 A1*   5/2012   Kishimoto .............. F21S 41/16
                                                          362/510

OTHER PUBLICATIONS

Written Opinion dated Oct. 4, 2018 of International application No. PCT/EP2018/066967.
Müller et al., 2012, "Femtosecond-laser-written diode-pumped Pr:LiYF4 waveguide laser", Optics Letters, 37(24):5223-5225.

* cited by examiner

LASER AUTOMOTIVE LAMP APPARATUS

CROSS REFERENCE TO RELATED APPLICATIONS

This application is a National Stage Entry of International Patent Application No. PCT/EP2018/066967, filed Jun. 25, 2018, which claims the benefit of foreign priority to Australian Patent Application No. AU 2017902480, filed Jun. 27, 2017, each of which is hereby incorporated by reference in its entirety for all purposes.

BACKGROUND

1. Field of the Invention

The present disclosure relates to automotive lighting systems. In a particular form the present disclosure relates to the use of laser lighting sources for automotive lighting systems.

2. Related Art

Compared to LED light sources, laser light sources offer small light emitting area and well defined light output geometry. However laser light sources are generally either complex and relatively fragile (eg HeNe gas lasers), and/or have a narrowband emitted wavelength (eg AlGaInP laser diode), and thus to date most uses have been limited to specific applications such as ranging applications, or high intensity warning devices for use in fog or rain where the generation of a single frequency is less of a limitation. However given the potential improvement in optic coupling efficiency and associated compact optic systems offered by laser light sources, it is desirable to use them to generate white light sources to replace existing white light LED and lamp systems.

To date, two main approaches have been used to generate laser based white light sources. The first and most common approach is to couple a laser light source with a light/wavelength converting material to generate a target colour such as white light. Most systems use a laser source in the blue to UV wavelength range coupled with a fluorescent phosphor that absorbs the laser photons and re-emits over the desired frequency band. In one system a non-linear optical fibre was used in place of the optical fibre to disperse or spread the incoming laser light over a desired wavelength range. These approaches can be used to create white light that has high intensity, but unfortunately the use of phosphors (and other light converting materials) has the disadvantage of losing the laser light characteristic of low beam angle (for example phosphor is naturally scattering). This results in increased optic element sizes in order to re-control the light, and thus increased light module package size. As space is often at a premium in automotive lighting applications this size increase is a significant disadvantage and the use of laser offers no significant benefit over the use of conventional LED technology.

The second main approach avoids the use of a wavelength converting (or spreading) element and instead generates white light through combining multiple laser sources, each of a different frequency. Through careful selection and arrangement of the Red, Green and Blue laser light sources with optical combining elements, a high intensity white light source can be generated with low beam angles. However the use of three laser light sources and associated optics has the disadvantage of increased cost, complexity and size, as the three sources generate significant heat (which must be dissipated) and the additional components results in increased light module size (like the phosphor based approaches), which also adds to manufacturing cost and complexity.

SUMMARY

According to a first aspect, there is provided a laser light source apparatus includes: a laser diode; a first optical assembly including one or more lenses for generating a collimated laser beam from light emitted by the laser diode; a doped microstructured glass block configured to generate laser emissions at at least a first wavelength and a second wavelength when pumped by the collimated laser beam; an input beam lens for focusing the collimated laser beam onto an input surface of the microstructured glass block; an optical alignment assembly including: a laser diode housing for mounting and aligning the laser diode and the first optical assembly; and a microstructured glass block mounting configured to mount and align the input beam lens and the microstructured glass block; an output light guiding assembly including at least one lens for collimating output light from an output surface of microstructured glass block into an output beam; and a housing for supporting the optical alignment assembly and the output light guiding assembly, wherein the laser diode housing is configured to dissipate heat from the laser diode and is constructed of a material that is thermally stable and has high thermal conductivity to maintain laser diode output within a predetermined acceptable output range, and the microstructured glass block comprises at least one microstructured waveguide that when pumped by the input beam generates multiple narrow band light emissions of different wavelengths.

In one form, the laser diode housing is constructed of a material with a thermal conductivity greater than or equal to 180 W/(m K) and a linear thermal expansion coefficient of less than $2 \times 10-5$ m/(m K). In a further form the laser diode housing is constructed from Aluminium.

In one form the laser diode is a blue light laser diode that emits light with a wavelength in the range 400 to 460 nm, and the at least a first wavelength and the second wavelength comprises a green wavelength in the range 495-570 nm and a red wavelength in the range 620-700 nm. In a further form the blue light laser diode emits at least at 442 nm and the first wavelength is 635 nm and the second wavelength is 527 nm.

In one form the doped microstructured glass block comprises at least a first coating on an input surface and at least a second coating on an output surface. Instead of one microstructured waveguide, there can also be a plurality of such waveguides.

In one form, the first wavelength and the second wavelength represent two different stimulated emissions due to decay of an excited electron in the doped microstructured glass block, the first wavelength having a larger emission efficiency than the second wavelength, and the first laser coating and the second laser coating are configured to increase the reflection efficiency of the second wavelength with respect to the first wavelength within the doped microstructured glass block. In one form each microstructured waveguide comprises an annular cylinder and the efficiency of the laser emission is controlled by selecting a length, inner diameter and/or wall thickness of the cylinder.

In one form the inner diameter of the cylinder in the doped microstructured glass block is in the range of 10 µm to 60 µm.

In one form, the first optical assembly comprises a first aspherical lens for collimating emitted light from the laser diode along a fast collimation axis, and a second aspherical lens for collimating emitted light from the laser diode along a slow collimation axis. In a further form the distance from the laser diode to the second aspherical lens is 4 times a distance from the laser diode to the first aspherical lens.

In one form, the first optical assembly comprises a composite lens including a proximal lens surface for collimating emitted light from the laser diode along a fast collimation axis, and a distal lens surface for collimating emitted light from the laser diode along a slow collimation axis. In a further form, the length of the composite lens is selected such that when mounted in the laser diode housing the distance from the laser diode to the distal lens surface is 4 times a distance from the laser diode to the proximal lens surface.

In one form, the apparatus further comprises a printed circuit board assembly (PCBA) and an electronic module for powering and controlling the laser diode mounted in the housing.

In one form, the laser light source apparatus is to be integrated into an automotive lighting module.

BRIEF DESCRIPTION OF DRAWINGS

Embodiments of the present disclosure will be discussed with reference to the accompanying drawings wherein.

DETAILED DESCRIPTION

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

In the following description, like reference characters designate like or corresponding parts throughout the figures.

Embodiments of a laser light source apparatus that uses a single laser source and a single optical element/laser oscillator (or gain medium) to generate multiple narrow band light emissions which are combined to produce a high intensity narrow beam output light source (eg yellow or red) suitable for use in automotive applications, will now be described. For example the system can be used to generate narrow band red and green light which can be combined to generate a high intensity narrow beam yellow light source, or narrow band blue, red and green light which is the combined to produce a high intensity narrow beam white light source. The single optical element is a laser oscillator including a doped microstructured glass block configured to generate laser emissions at at least a first wavelength and a second wavelength when pumped by a collimated laser beam. In one embodiment this is achieved through choice of coatings on an input surface and output surface of the doped glass block, and a plurality of microstructured waveguides within the doped glass block. The laser source is a blue light source such as a blue laser diode that pumps the doped glass block to generate at least a first wavelength and a second wavelength that represent two different stimulated emissions due to decay of an excited electron in the doped microstructured glass block. For example these may be a green wavelength in the range 500 to 560 nm and a red wavelength in the range of 595 to 700 nm. Additional wavelengths may be generated such as blue wavelength, or the coatings may allow some of the input blue light to pass through the output coating. The microstructures are configured to control the gain or efficiency of the stimulated laser emissions. The configuration of the laser light source and the doped microstructured glass block thus generate multiple narrow band light emissions of different wavelengths which can be combined to generate a single output beam that retains the desired laser properties of high intensity and low beam angles with a desired output colour spectrum (eg white light). This single diode and doped microstructured glass block arrangement avoids the use of a scattering phosphor (or similar dispersive or scattering component), or the complexity of multiple laser sources and optical assemblies.

Figure 1A:
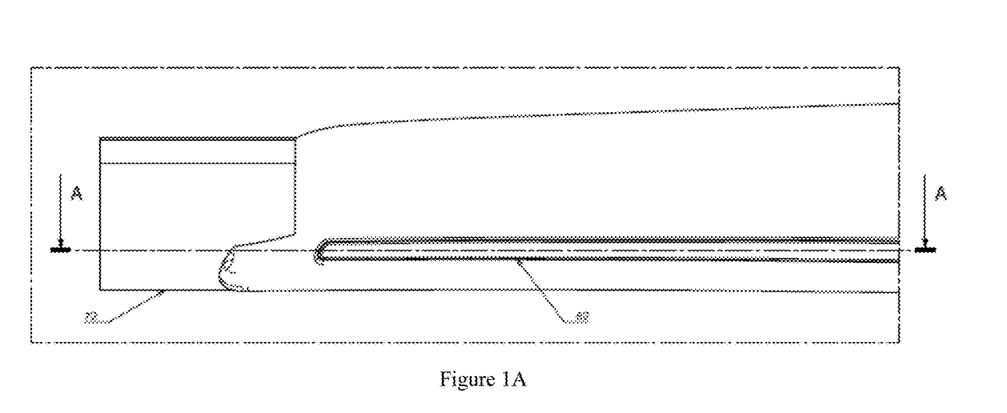
FIG. 1A is a schematic front view of an automotive lighting module with a laser light source apparatus.
Figure 1B:
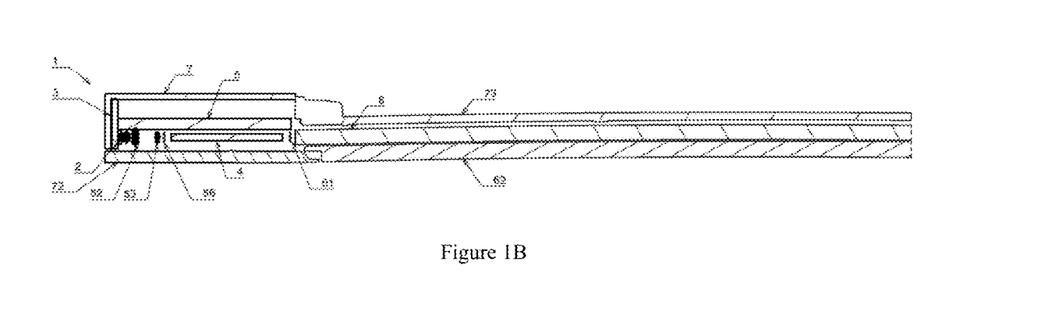
FIG. 1B is a cross section of the module of FIG. 1A along AA.

Referring now to FIGS. 1A and 1B showing an automotive lighting module with a laser light source apparatus 1 in front view and in cross-section, respectively. Fin detail, in FIG. 1A an output lens 62 within a front face 72 can be seen, whereas FIG. 1B taken along line AA of FIG. 1A reveals structural components of the laser light source apparatus 1, including a laser diode 2 on a printed circuit board assembly (PCBA) 3 in front of a laser oscillator 4 together with an optical alignment assembly 5, a light guiding assembly 6 and a housing 7. The optical alignment assembly 5 comprises 3 acylindrical lenses 52, 53, 56; and the light guiding assembly 6 comprises an aspherical lens 61, between the front face 72 and a rear face 73.

Figure 2A:
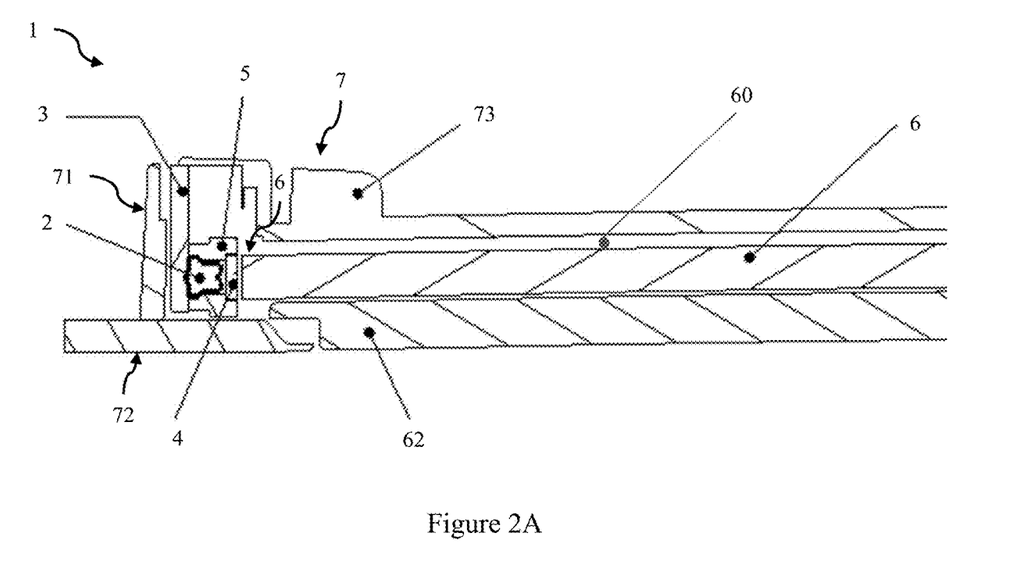
FIG. 2A is a cross-sectional view of a laser light source apparatus according to a second embodiment.

The laser light source apparatus 1 of FIG. 2A also comprises a laser diode 2 connected to a printed circuit board assembly (PCBA) 3 and electronic module which provides power and controls laser diode emissions (eg on/off switching). In this embodiment the laser diode is a blue light laser diode which generates laser emissions in 400 to 460 nm wavelength range. In one embodiment the blue light laser diode produces emission at 442 nm. The output of the laser diode 2 is focussed into a laser oscillator in the form of a microstructured glass block 4 via an optical alignment assembly 5. A light guiding assembly 6 focuses and directs the output of the microstructured glass block 4 to a desired output location. A housing 7 contains and supports the components of the apparatus 1.

The optical alignment assembly 5 interfaces with the PCB 3 and housing 7 and is used to mount and align the laser source 2 with the laser oscillator in form of the microstructured glass block 4 and optical components such as an output beam aspherical lens 61 in the light guiding assembly 6. This is shown in greater detail in FIGS. 2B and 2C which are schematic diagrams of a first and second optical layout for the laser light source apparatus 1. The first optical layout uses a pair of separated acylindrical lenses 52 and 54 to focus the light from the laser diode 2 into the glass block 4 whereas the second optical layout uses a single combination acylindrical lens element 55. The use of a single lens is simpler for volume manufacture as there is one less part and fewer tolerances to control.

Figure 2B:
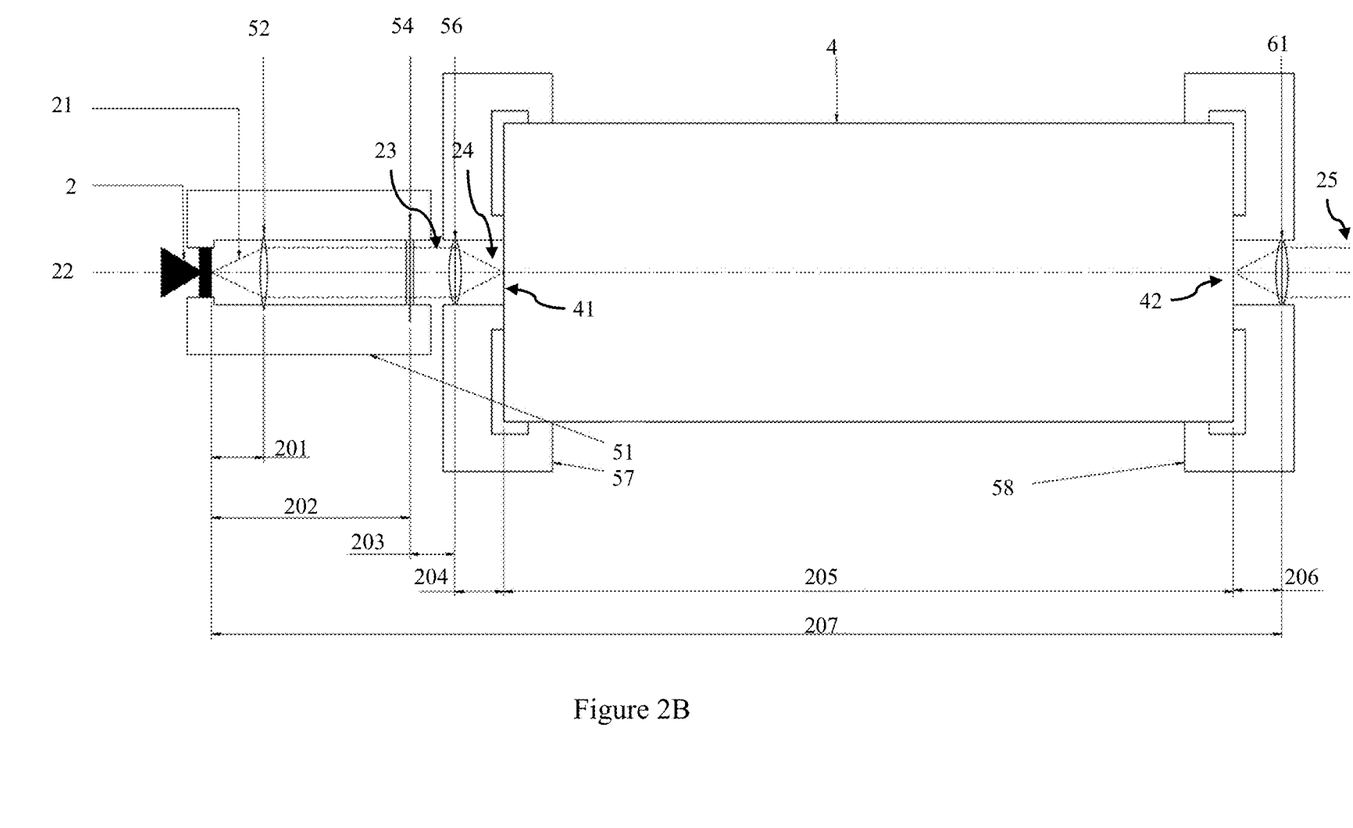
FIG. 2B is a schematic diagram of an optical layout for a laser light source apparatus according to a third embodiment.
Figure 2C:
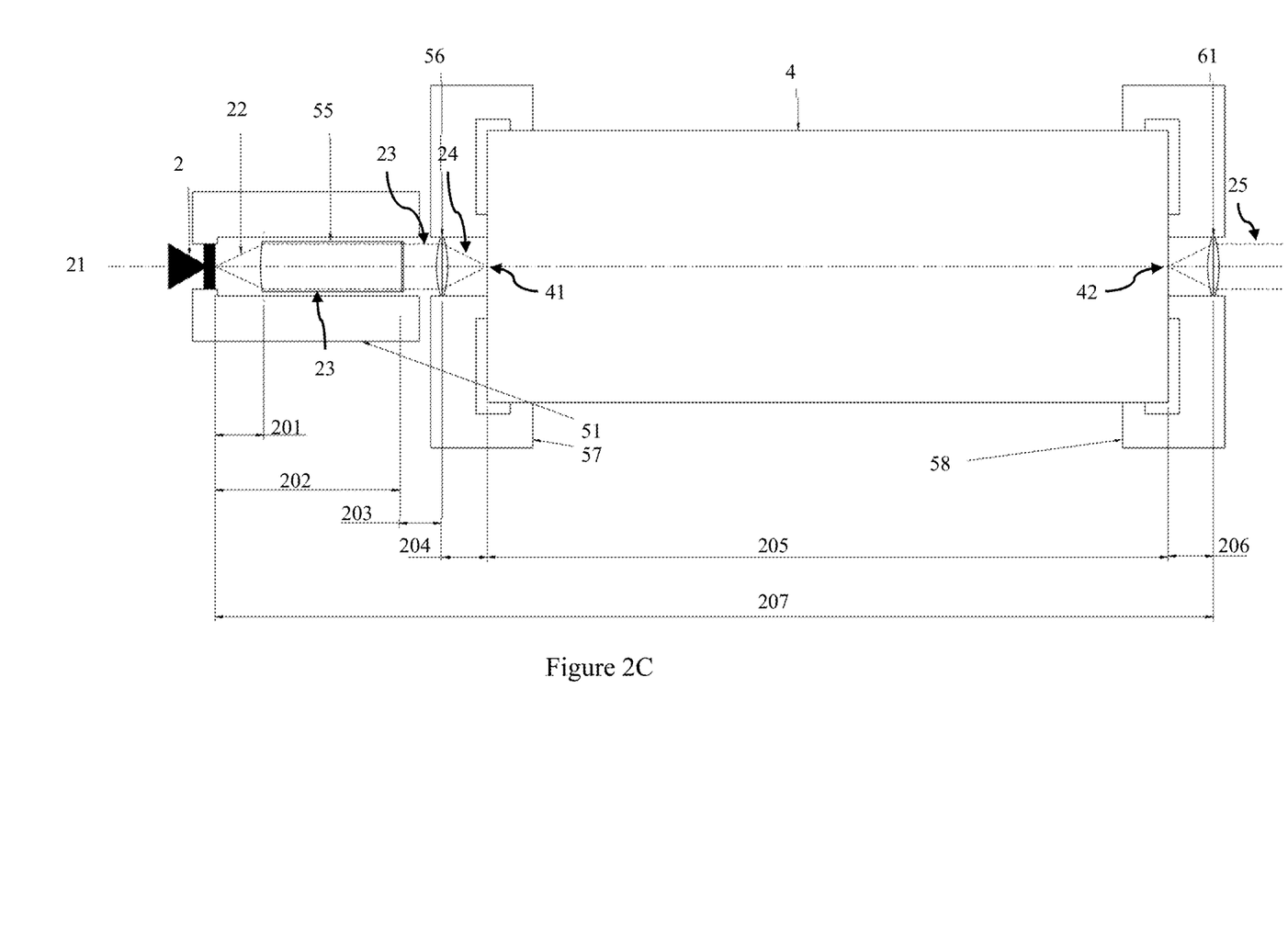
FIG. 2C is a schematic diagram of an optical layout for a laser light source apparatus according to a fourth embodiment.

The optical alignment assembly 5 comprises a laser diode housing 51 that mounts and aligns the laser diode 2 and the first and second acylindrical lenses 52 and 54 (FIG. 2B), or the combined acylindrical lens 55 (FIG. 2C). As shown in FIGS. 2B and 2C, the laser diode 2 outputs a light beam 21 along an optical axis 22. The laser diode housing 51 aligns the laser, and laser axis/beam 21/22 with the first acylindrical lens 52 in the arrangement shown in FIG. 2B or with the front surface of combined acylindrical lens 55 in the arrangement shown in FIG. 2C. In the case of the arrangement shown in FIG. 2B, the first acylindrical lens 52 provides fast axis collimation and the second acylindrical lens 54 provides slow axis collimation to produce a collimated laser diode beam 23. In the case of the arrangement shown in FIG. 2C the combined acylindrical lens 55 comprises a proximal lens surface for collimating emitted light from the laser diode along a fast collimation axis, and a distal lens surface for collimating emitted light from the laser diode along a slow collimation axis (i.e. it provides both fast and slow axis collimation) to produce collimated laser diode beam 23.

The optical alignment assembly 5 further comprises a microstructured glass block mounting configured to mount and align an input beam lens 56 and the microstructured glass block 4. As shown in FIG. 2B the microstructured glass block mounting comprise a proximal support 57 and a distal support 58 which mounts and align the microstructured glass block 4 with the laser diode housing 51 and collimated laser diode beam 23. The proximal support 57 also mounts and aligns the input laser diode (aspherical) lens 56 that focuses 24 the collimated laser diode beam 23 onto an input surface 41 of the microstructured glass block 4, which may be focused as a point or an extended region around the optical axis 21. The microstructured glass block 4 acts as a laser oscillator and wave guide to generate and guide multiple laser beams of different wavelengths from the input laser diode beam 23. The distal support 58 mounts an output beam aspherical lens 61 that collimates the output light from an output surface 41 of microstructured glass block 4 into a single output beam 25 along optical axis 21. The light guiding assembly can then guide this single output beam to a desired output location (eg along light pipe 60 and output lens/cover 62). For example the microstructured doped glass block 4 may be used to convert (or pass through) the input blue laser diode light beam 23 into narrow band blue, narrow band red and narrow band green light beams (sources) which are then emitted from the distal end of the microstructured doped glass block and optically combined to generate a white light source suitable for use in automotive applications.

Figure 3A:
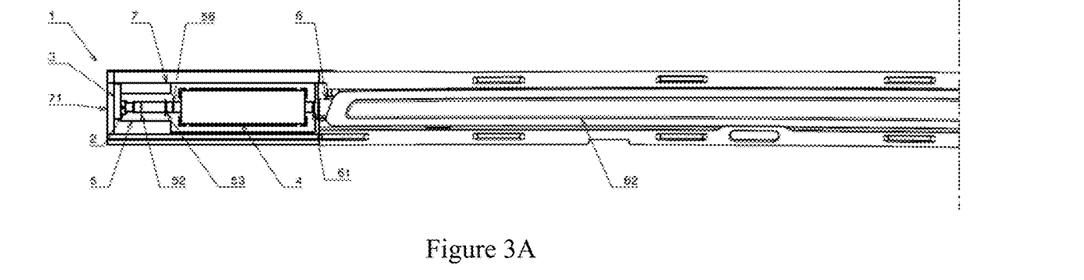
FIG. 3A is a schematic front view of an automotive lighting module with a laser light source apparatus according to a fifth embodiment, without front face.
Figure 3B:
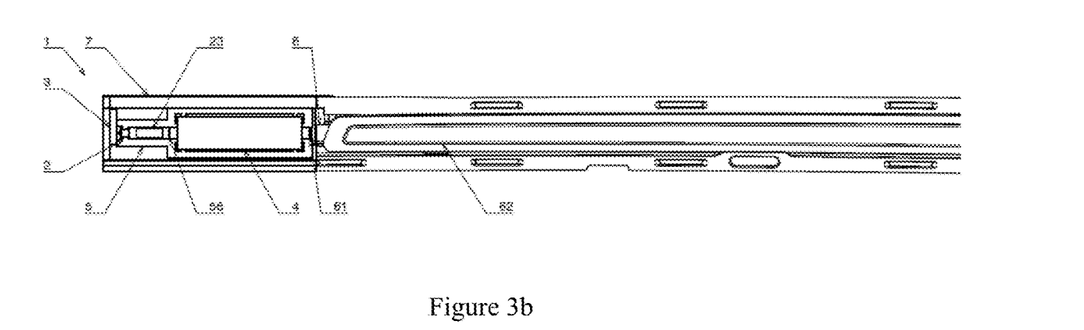
FIG. 3B is a schematic front view of an automotive lighting module with a laser light source apparatus according to a sixth embodiment, without front face.

FIGS. 3A and 3B show front views of a laser light source apparatus 1 after removing the front face 72, with a plurality of acylindrical lenses 52, 53 and with a combined acylindrical lens 55 generating a collimated laser diode beam 23.

The optical alignment assembly 5 is used to both support the laser diode 2 and optical elements (lenses 52, 53, 54, 55, 56, 61 and microstructured glass block 4) and maintain the components in the desired geometry as well as to assist in dissipating heat. The output of a laser diode degrades significantly with temperature and thus to ensure the laser diode is able to produce a suitable output (ie within a predefined acceptable output range), the laser diode housing 51 surrounding the laser diode 2 is thermally stable and has high thermal conductivity to maintain laser diode output within a predetermined acceptable output range. In one embodiment the laser housing 21 is constructed from aluminium with a thermal conductivity of 200 W/(m K) and linear thermal expansion coefficient of $22 \times 10^{-6}$ m/(m K). In other embodiments, materials with similar thermal properties (eg within about 10%) or better thermal properties may be used, for example a thermal conductivity greater than or equal to 180 W/(m K) and a linear thermal expansion coefficient of less than $2 \times 10^{-5}$ m/(m K). Additional heat dissipation elements or connections (eg fins, heat sinks) may be connected to the laser diode housing 51 to assist in heat dissipation. As the laser diode is the primary source of heat, the housing is designed to maximise the contact area between the conductive housing material and laser diode.

Heat dissipation is less significant for other components, and thus the proximal and distal supports 57 and 58, as well as a housing 7 may be formed of other suitable materials. These may include Acrylonitrile Butadiene Styrene (ABS), other thermoplastics suitable for injection moulding, or machinable or 3D printable plastics or materials. As the light source apparatus is intended for automotive applications, the materials and assembly should be suitable for use in typical automotive operating environment (eg in terms of corrosion resistance, heat, and vibration).

The light guiding assembly 6 focuses and directs the output of the microstructured glass block 4 to a desired output location. In this embodiment the light guiding assembly 6 comprises a lens located after the glass block 4 to focus light into the light pipe 6 which directs the light to an output surface 74. The output surface may be a transparent lens or a cover with one or more transparent portions to protect the light pipe and allow light output. In other embodiment the light guiding assembly 6 can comprise a light guiding element, or elements with optical of diffusing particles or elements, or a reflector system to distribute or direct light to a desired output location or zone.

The housing 7 supports and contains the apparatus and comprises a PCB support surface 71, a front face 72 and a rear face 73. In this embodiment the front face is a two component face including a support component connected to the PCB support face and parallel with the output surface 74.

As outlined above the system avoids the use of a scattering phosphor to create different colours of light by using a laser oscillator consisting of a doped glass block 4 containing a series of microstructures. The dopant acts to generate emissions at multiple wavelengths, coatings on the input and output surfaces are selected to contain desired emissions wavelengths within the glass block (and give rise to lasing) and the microstructures act as waveguides to control beam quality. This enables the system to generate separate laser light beams each with different characteristics (eg wavelengths and intensity) when pumped by a blue laser.

Figures 4A, 4B, 4C:
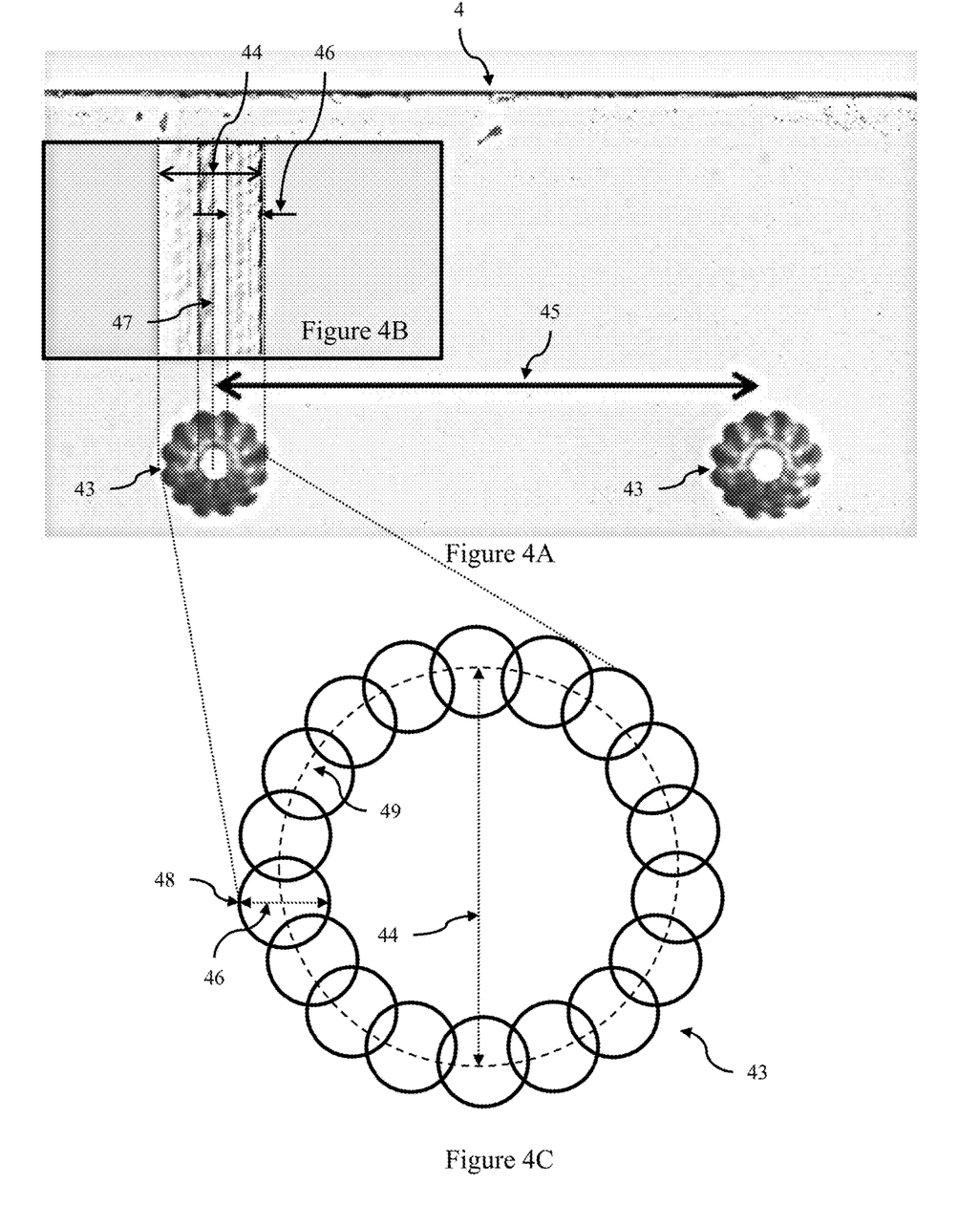
FIG. 4A is an end on view of a microscope image of a ZBLAN Glass block according to an embodiment.
FIG. 4B is a top view of the microscope image of FIG. 4A.
FIG. 4C is a schematic showing overlapping cylindrical filaments that form a microstructure waveguide according to an embodiment.

In this embodiment the microstructured glass block 4 is a 30 mm Pr doped ZBLAN Glass block. The ZBLAN glass block is doped with Praseodymium in the range of 0.1-1.0 mol %. In another embodiment the glass block also comprises microstructures in the form of 1 to 100 waveguides 43. The waveguides 43 are arranged to be spaced apart such that they are parallel to each other and lie in a single plane, as shown in FIG. 4A which is an end on view of a microscope image of waveguides 43 in a ZBLAN glass block 4. In this embodiment a spacing 45 of 450 μm was used. The centrelines 47 of the waveguides 43 are parallel to the normal planes of the optic input surface 41 and output surface 42 (or faces) as further shown in FIG. 4B which is a top view of a microscope image of waveguide 43 in a ZBLAN glass block.

As shown in FIG. 4C, the waveguides 43 are annular cylindrical waveguides in which the walls are formed from a plurality of adjacent cylindrical element 48 of the base glass material with a modified refractive index which is less than the refractive index of the majority of the ZBLAN glass (around 1.5). These cylindrical elements 48 form the walls of the waveguide 43 (the wall thickness 46 is thus the diameter 46 of these cylindrical elements 48) and are arranged with equal spacing on a pitch circle 49 diameter with a diameter 44 of between 10 to 60 μm, as shown in FIG. 4C. The cylindrical elements 48 have a diameter 46 within the range of 1 to 15 μm. These cylindrical elements have a modified refractive index to create a waveguide with numerical aperture within the range 0.01 to 0.05. The waveguide 43 will have an output wavelength range including of either or both wavelength ranges 500-560 nm and 600-660 nm. The microstructure cylindrical elements 48 can be formed in the ZBLAN glass block by firing a series of ultra-short laser pulses (ie. <250 fs) from a focused laser beam such as an ultrafast Ti: Sapphire laser oscillator.

The parameters of each of the waveguides 43 such as refractive index of cylinders 48, wall thickness/diameter 46 of cylindrical elements 48 and overall diameter of waveguide 43 as well as the spacing 45, can be selected or controlled to vary to gain of the cavity and thus the efficiency of the lasing. That is, the amount of 442 nm input pump laser light that is absorbed and reemitted at another wavelength is controlled by these parameters. Note that the parameters of the waveguide do not affect which emission wavelength is generated (this is a property of the dopant/material). In particular the most important parameter for controlling the beam quality is the wall thickness 46 and as mentioned above this is selected within the range of 1 to 15 μm for this embodiment such that the waveguide structure 43 has an overall diameter 44 of 10 to 60 μm. The exact length of the microstructured glass block 4 is not critical and can be varied. However there is a relationship between the length of the glass block 205 and the amount of power converted from blue to other wavelengths—in general the length of the waveguide is matched to absorb the power of the blue pump which also depends on the specific wavelength of the blue pump light. The length of the microstructured glass block is thus one parameter that can be used to alter the emitted colour and power. Typical glass block lengths are 5 to 30 mm.

The choice of input laser diode lens 56 (and more generally lenses 52, 54, 55, and 61) is based on physical optics—with the focal length and numerical aperture of the laser beam matched to the microstructured light guide in the glass block 4. If the focal length or positional tolerance of the input laser diode lens 56 is poorly matched to the microstructured glass block 4 then some of the light will not enter the waveguide reducing efficiency. If the numerical aperture of the input aspherical lens 56 is substantially greater than required (ie matched value) then the light will enter the microstructured glass block 4 but not be trapped and exit through the sides of the microstructured glass block 4 (reducing efficiency). Exact choice of focal length and numerical aperture will thus depend upon the diameter of the microstructured glass block 4. As would be understood by the person of skill in the art, similar concerns also apply to lenses 52, 54, 55 used to produce the collimated input laser diode beam to input laser diode lenses 56 and thus the focal length and numerical aperture of these lenses will also be matched to the microstructured glass block 4 and overall optical assembly. Similarly the focal length and numerical aperture of output beam lens 61 should be matched to the microstructured glass block 4 to ensure adequate capture and focusing of output light beams.

The microstructured glass block 4 is coated on the optic input surface 41 and output surface 42 (or faces). These coatings are constructed to reduce light transmission losses of the pump light and to target high reflectivity in the cavity for certain wavelengths. This high reflectivity range is targeted to include the desired emission wavelength. Light with the desired emission wavelength is therefore increased in intensity within the lasing cavity. The pump wavelength is highly transmitted at the block input interface (or surface) 41 and highly reflected at the block output interface (or surface) 42. The low percentage of transmitted light at the block interface is the output of the system.

Figure 5:
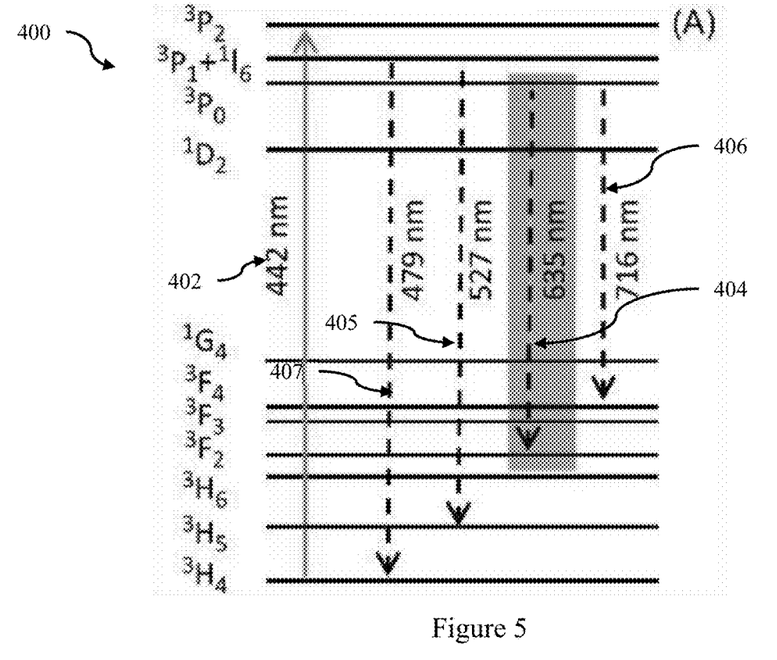
FIG. 5 is a schematic energy level diagram for a Pr doped ZBLAN Glass block according to an embodiment.

FIG. 5 is a schematic energy level diagram 400 for a Pr doped ZBLAN glass block according to an embodiment. The laser diode 2 acts as the pump laser to provide excitation energy at a wavelength of 442 nm (that is the pump laser generates/emits at least at 442 nm). This excites electrons in the dopant (Pr) to an elevated energy state (or level), and as the electrons drop down to lower energy states (or levels) they emit photons with characteristic wavelengths (energies). That is the emission of the system then corresponds to the difference in excitation energy of these states. For this system the dominant emission is red light emission 404 at an emitted wavelength of 635 nm followed by weaker a green light emission 405 at an emitted wavelength of 527 nm. The energy level system additionally generates a red/infrared emission 406 at 716 nm and a blue emission 407 at a wavelength of 479 nm. The different emissions are generated with different efficiencies, with the dominant emission being the red emission 404 followed by the green emission 405.

Figure 6:
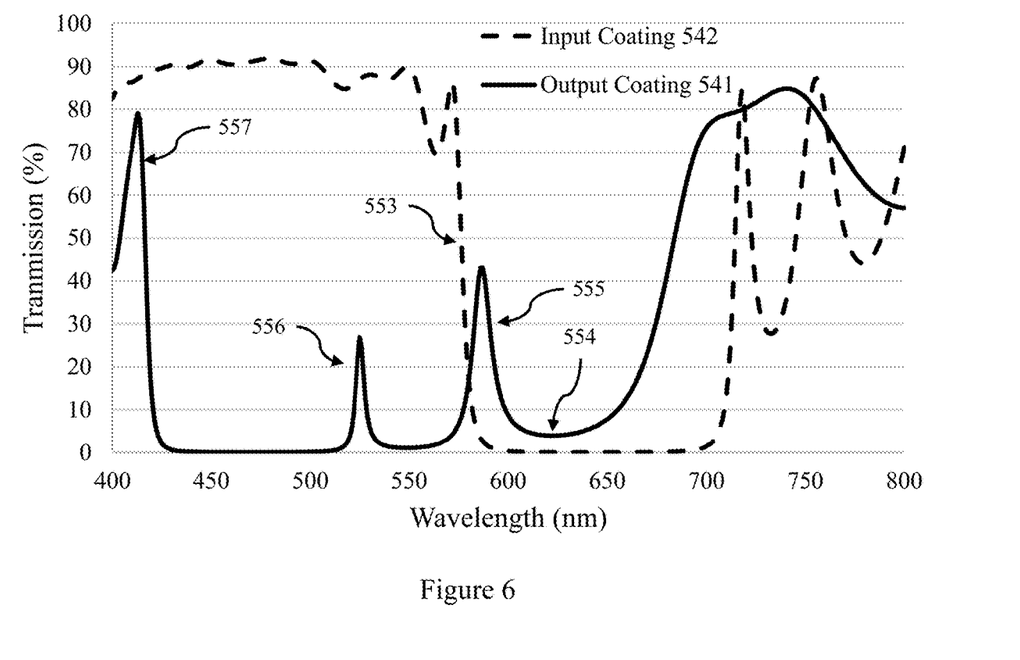
FIG. 6 is a transmission spectrum for the coatings on the input surface and output surface of the doped ZBLAN Glass block according to an embodiment.

In this embodiment the coatings on the microstructured glass block 41 42 are three layers including $Al_2O_3$ (first layer, Aluminium Oxide), $Ta_2O_5$ (Second layer, Tantalum Oxide) and $MgF_2$ (third and final layer, Magnesium Fluoride). FIG. 6 is a plot of the transmission spectrums for the input coating (dashed line) 542) and output coating 541 coatings (solid line) when emission at 635 nm is targeted (as per FIG. 5). As can be seen in this figure the input coating 542 is highly transmissive (90%) to the input 442 nm wavelength and has almost no transmission (ie 100% reflectance) in a band 553 spanning the 600 to 700 nm range to ensure the 635 nm wavelength is reflected and contained within the cavity to generate lasing. The output coating 541 is highly reflective (low transmission %) over most of the visible range (400 to 700 nm) with a low transmission of 5% window around the 635 nm wavelength, with additional transmission peaks 555, 556, and 557 around 587 nm (43% Full Width Half Maxima (FWHM) 12 nm), 525 nm (27%; FWHM 6 nm) and 413 nm (79%; FWHM 17 nm), respectively. The green 527 nm emission 405 is thus within the transmission window centred at 525 nm (with a transmission efficiency of 18%). By controlling or tuning reflection spectrum of the coatings 541, 542 the system can be configured to increase the efficiency of the weaker 527 nm emission. That is through choice of coating properties (i.e. transmission/reflectance at emission wavelengths) the system can be tuned to produce a mixture of light with a particular ratio of wavelengths.

In the above case the coatings are tuned to generate and output red and green laser emissions. The output coating 541 has a transmission efficiency of just 0.1% at 442 nm and thus only a very small amount of blue laser emissions from the laser diode (laser source) will pass through the laser oscillator/laser oscillator/gain medium and be output. If, based on the desired output light requirements, some additional blue light emission is desired in the output, then the transmission efficiency of the output coating at the source wavelength could be increased. That is the output beam could comprise red and green wavelength components generated in the laser oscillator/gain medium (due to stimulated emission by the source laser) and a blue wavelength component from the source laser (that has passed through the laser oscillator/gain medium). Typically the intensity of the source laser will be significant compared to the intensity of the emitted wavelengths, so only a small increase in the transmission efficiency is required such as 0.1% to 0.5% or 1% but other values can be selected based on the desired output requirements. Alternatively if a blue light component is required another approach would be to target the 479 nm emission and tune the coating to output this component.

The typical divergence ratio between the fast and slow axes for a laser diode is 4:1. The ratio of distance from the diode to the lenses (focal lengths) thus needs to match this ratio to create a circular beam profile (4:1). The important dimension for positioning each of the lenses is the distance to the diode emission point. Additionally given this 4:1 ratio the geometric tolerance on the second acylindrical lens 54 will be 4× the geometric tolerance on to first acylindrical lens 52. In this embodiment the expected range for producing different diameter beams for focussing into the microstructured glass block 4 is as follows:

Distance 201 from laser diode 2 to first acylindrical lens 52: 1-3 mm;

Distance 202 from laser diode 2 to second acylindrical lens 54: 5-11 mm;

Distance 203 from second acylindrical lens 54 to input laser diode lens 56: 1.86 mm;

Distance 204 from input laser diode lens 56 to input surface 41: 0-4 mm;

Length 205 of microstructured glass block 4: 30 mm;

Distance 206 from output surface 42 to output beam lens 61: 0-4 mm; and Length 207 from the laser diode 2 to the output beam lens 61: 44 mm.

The above ranges (tolerances) are the expected range for producing different diameter beams for focussing into the waveguide 4—and are not just the geometric tolerance for a particular setup.

In this embodiment the gain (or lasing) medium is a ZBLAN glass block comprised of around 52 mol. % ZrF4, 20 mol. % BaF2, 4 mol. % LaF3, 3 mol. % AlF3, and 20 mol. % NaF. However, other ZBLAN (ZrF4, BaF2, LaF3, AlF3, and NaF) glasses are generally suitable as well as glasses including indium and fluorine. Alternatively, the glass may be one of a Lead-silicate glass; a Germanate glass; a Tellurite glass; a glass with a bismuth content of at least 30 mol. % Bi2O3, a Chalcogenide glass; a Phosphate glass, and a Fluoride-phosphate glass (also referred to as a fluorophosphate glass. In this embodiment the dopant is Praseodymium in the range of 0.1-1.0 mol %. However other suitable dopants include Tm ions, Ho ions, Er ions, Dy ions, Yb ions and Nd ions. Alternatively, the centres may be, for example, quantum dots or molecules or any other suitable centre that may be used to amplify light. The centres in the waveguides 43 amplify the light when so guided by the structure. The amplification is by stimulated emission of radiation which occurs when the centres are illuminated by another light source (eg the laser diode light source 21).

The system can be modified to be used with other dopants, laser oscillator/gain medium or input laser wavelengths. The choice of the dopant/gain medium combination will determine the energy level structure (eg FIG. 5). This then determines the required input (pump) laser wavelength to excite the dopant, and which wavelengths will be emitted according to the allowed transitions from exited states to lower energy states. Thus from a design perspective, once the characteristics of the output light are determined a suitable dopant/gain medium/laser source combination can be selected that is capable of generating the required output wavelength components that can be mixed to generate the desired output. Next the laser input power, microstructures and coatings are selected taking into account the efficiency with which the desired output wavelengths are generated. These three factors work in combination (that is they all influence the quality and intensity of the output laser beam components) and thus choice of one factor (or parameter) may affect the choice of another factor, and some trade-offs may be made. The pump laser power is selected to provide sufficient power (ie input photons) to ensure that the desired output wavelengths are generated with sufficient intensity. The physical size of the laser oscillator/gain medium and the microstructure waveguide parameters (eg dimensions, number, spacing), and in particular the wall thickness 46, are selected to control the gain and output beam quality. Selection of the input and output coatings is performed to ensure sufficient containment of the emitted wavelengths within the laser oscillator/gain medium to generate the desired laser output components. Further as the different wavelength components will be generated and emitted with different efficiencies, the input and output coatings are typically tuned (or selected) to generated the desired output characteristics. For example the coatings may be selected to increase the efficiency of the weaker emission(s). Finally the housing material is selected and configured to ensure sufficient heat dissipation from the laser source (eg pump laser diode) so that the efficiency of the laser source can be maintained during operation and geometry of the optical system is stable The present system uses a single laser source and a single optical element (microstructured glass block 4) that outputs a plurality of laser components (each of a different wavelength) which can be combined to generate an output light beam with desired properties. For example the above system emits narrow band red and narrow band green light (wavelengths which can be combined to generate a yellow light. By allowing a component of the input narrow band light to pass through the laser oscillator/gain medium, a white light output can be generated. As each of the output components is a laser beam output, the combined output is light (eg yellow, white, etc) with high intensity and narrow beam properties and thus provide a simple and compact light source suitable for use in automotive applications. The laser light source apparatus can be used to manufacture an automotive light module that outputs yellow or white laser light (or some other colour). This module could be built as a stand-alone light source module, or incorporated directly into lighting assemblies, and may be used for automotive turn signals and ground illumination lamps, spot lights, logo projector lamps, automotive interior illumination, exterior trim illumination, fog lights, headlamps, tail-lamps and daytime running lamps.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the scope.

REFERENCE SIGNS 1 laser light source apparatus
2 laser diode
3 printed circuit board assembly (PCBA)
4 laser oscillator, microstructured glass block
5 optical alignment assembly
6 light guiding assembly
7 housing
21 light beam
22 optical axis
23 collimated laser diode beam, input blue laser diode light beam
24 focus
25 single output beam
41 input surface
42 output interface, output surface
43 waveguide
44 waveguide
45 spacing
46 wall thickness, diameter
47 centreline
48 cylindrical element
49 pitch circle
51 laser diode housing
52 acylindrical lens, fast axis collimation
53 acylindrical lens, slow axis collimation
54 acylindrical lens, slow axis collimation
55 acylindrical lens
56 input laser diode (aspherical) lens
57 proximal support
58 distal support
60 light pipe
61 aspherical lens, output beam aspherical lens
62 output lens, cover
71 support surface
72 front face
73 rear face
74 output surface
201 distance from laser diode 2 to first acylindrical lens 52
202 distance from laser diode 2 to second acylindrical lens 54
201 distance from second acylindrical lens 54 to input laser diode lens 56
204 distance from input laser diode lens 56 to input surface 41
205 length of microstructured glass block 4
206 distance 206 from output surface 42 to output beam lens 61
207 length from the laser diode 2 to the output beam lens 61
400 energy level diagram
404 red light emission
405 green light emission
406 red/infrared emission
407 blue emission
541 output coating
542 input coating
553 band
555 transmission peak
556 transmission peak
557 transmission peak

What is claimed is:

1. A laser light source apparatus, comprising:
a laser diode;
a first optical assembly comprising one or more lenses for generating a collimated laser beam from light emitted by the laser diode;
a doped microstructured glass block configured to generate laser emissions at at least a first wavelength and a second wavelength when pumped by the collimated laser beam;

an input beam lens for focusing the collimated laser beam onto an input surface of the microstructured glass block;

an optical alignment assembly comprising:
  a laser diode housing for mounting and aligning the laser diode and the first optical assembly; and
  a microstructured glass block mounting configured to mount and align the input beam lens and the microstructured glass block;

an output light guiding assembly comprising at least one lens for collimating output light from an output surface of the microstructured glass block into an output beam; and a housing for containing and supporting the optical alignment assembly and the output light guiding assembly, wherein the laser diode housing is configured to dissipate heat from the laser diode and is constructed of a material that is thermally stable and has high thermal conductivity to maintain laser diode output within a predetermined acceptable output range, and the microstructured glass block comprises at least one microstructured waveguide that, in response to being pumped by the input beam, generates multiple narrow band light emissions of different wavelengths.

2. The apparatus of claim 1, wherein the laser diode housing is constructed of a material with a thermal conductivity greater than or equal to 180 W/(m K) and a linear thermal expansion coefficient of less than 2×10−5 m/(m K).

3. The apparatus of claim 1, wherein the laser diode housing is constructed from Aluminium.

4. The apparatus of claim 1, wherein the laser diode is a blue light laser diode that emits light with a wavelength in the range 400 to 460 nm, and the at least first wavelength and the second wavelength comprises a green wavelength in the range 495 570 nm and a red wavelength in the range 620 700 nm.

5. The apparatus of claim 1, wherein the blue light laser diode emits at least at 442 nm and the first wavelength is in the range from 625 nm to 645 nm and the second wavelength is in the range from 520 nm to 540 nm.

6. The apparatus of claim 1, wherein the doped microstructured glass block comprises at least a first coating on an input surface and at least a second coating on an output surface, and one or more microstructured waveguides.

7. The apparatus of claim 6, wherein the first wavelength and the second wavelength represent two different stimulated emissions due to decay of an excited electron in the doped microstructured glass block, the first wavelength having a larger emission efficiency than the second wavelength, and the first laser coating and the second laser coating being configured to increase the reflection efficiency of the second wavelength with respect to the first wavelength within the doped microstructured glass block.

8. The apparatus of claim 6, wherein each of the one or more microstructured waveguides comprises an annular cylinder or cylindrical element with the efficiency of the laser emission being controlled by selecting at least one of a length of the cylinder, an inner cylinder diameter, or a cylinder wall thickness.

9. The apparatus of claim 1, wherein a diameter of the doped microstructured waveguide ranges from 10 μm to 60 μm.

10. The apparatus of claim 9, wherein the first optical assembly comprises a first aspherical lens for collimating emitted light from the laser diode along a fast collimation axis, and a second aspherical lens for collimating emitted light from the laser diode along a slow collimation axis.

11. The apparatus of claim 10, wherein a distance from the laser diode to the second aspherical lens is four times a distance from the laser diode to the first aspherical lens.

12. The apparatus of claim 1, wherein the first optical assembly comprises a composite lens comprising a proximal lens surface for collimating emitted light from the laser diode along a fast collimation axis, and a distal lens surface for collimating emitted light from the laser diode along a slow collimation axis.

13. The apparatus of claim 1 wherein the length of the composite lens is selected such that, in response to being mounted in the laser diode housing, a distance from the laser diode to the distal lens surface is four times a distance from the laser diode to the proximal lens surface.

14. The apparatus of claim 1, further comprising a printed circuit board assembly (PCBA) and an electronic circuit for powering and controlling the laser diode mounted in the housing.

15. An automotive lighting module comprising the laser light source apparatus of claim 1.

* * * * *